(12) United States Patent
Koike

(10) Patent No.: US 6,844,832 B2
(45) Date of Patent: Jan. 18, 2005

(54) INPUT DATA CONVERSION METHOD, INPUT DATA CONVERSION PROGRAM, AND INPUT DATA CONVERSION SYSTEM

(75) Inventor: Yuji Koike, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 418 days.

(21) Appl. No.: 10/155,498

(22) Filed: May 24, 2002

(65) Prior Publication Data

US 2003/0146857 A9 Aug. 7, 2003

(30) Foreign Application Priority Data

May 28, 2001 (JP) ........................................ 2001-158607

(51) Int. Cl.⁷ ............................................. H03M 5/00
(52) U.S. Cl. ...................................................... 341/55
(58) Field of Search .............................. 341/55, 50, 51, 341/52

(56) References Cited

U.S. PATENT DOCUMENTS 4,797,883 A * 1/1989 Kraus ........................ 370/521

* cited by examiner

Primary Examiner—Brian Young
(74) Attorney, Agent, or Firm—Morrison & Foerster LLP

(57) ABSTRACT

An input module (30) notifies a module manager (21) of the output data format of the input module, and the module manager (21) generates a first data conversion module (31) based on the notification and joins the data conversion module to the end of a pipeline. The data conversion module (31) notifies the module manager (21) of the output data format of the data conversion module, and the module manager (21) generates a second data conversion module (32) based on the notification and joins the data conversion module to the end of the pipeline. The operation is repeated as many times as the number of multiplexing stages of multiplexed input data and an output module is joined to the termination position of the pipeline.

7 Claims, 8 Drawing Sheets

FIG. 5
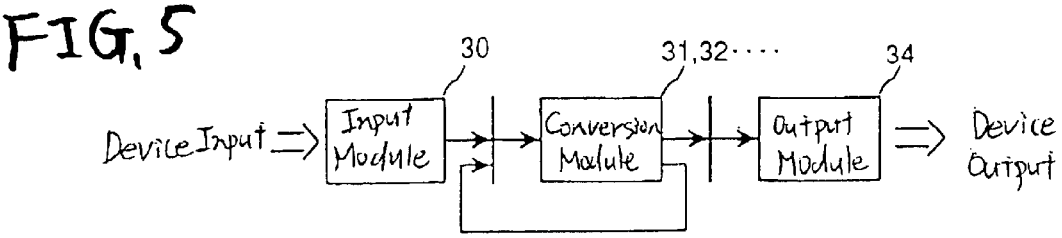
FIG. 6
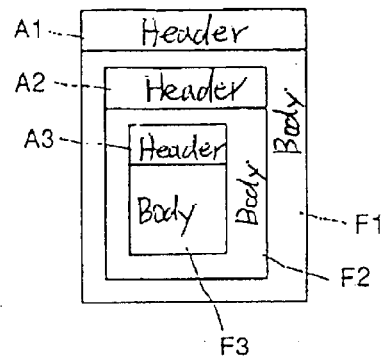
| 1 | TAG | · · · · | OPERATION TYPE IS SPECIFIED |
| 2 | URL | · · · · | URL IS SPECIFIED |
| 3 | MIME | · · · · | MIME TYPE IS SPECIFIED |
| 4 | EXT | · · · · | EXTENSION IS SPECIFIED |
| 5 | ADDITIONAL INFORMATION | · · · · | ADDITIONAL INFORMATION IS ADDED AS REQUIRED |
FIG. 7

INPUT DATA CONVERSION METHOD, INPUT DATA CONVERSION PROGRAM, AND INPUT DATA CONVERSION SYSTEM

BACKGROUND OF THE INVENTION

This invention relates to a dynamic conversion method of input data, a dynamic conversion program of input data, and a dynamic conversion system of input data, capable of processing media data in various formats.

As data communication modes and data retention modes using a computer are diversified and data types go to multimedia, flexibility of data conversion (decode) becomes necessary in a data reception, decode party. For example, if input data is compressed data represented by an extension of ".zip," the data reception party requires a data conversion module (program) for expanding the compressed file in the ".zip" format. For example, when input data encoded in a specific format is decoded, the data reception party requires a data conversion module for decoding corresponding to the specific format. In this case, in many closed systems, input data can be designed in a fixed data conversion format and thus the reception party may comprise only the specific data conversion module corresponding to the data conversion format. However, in an open system of the Internet, etc., or a system for handling different types of data conversion formats, if the data conversion module is fixed, it is made impossible to handle every input data.

Then, hitherto, the following (A) or (B) system has been adopted:

(A) In the system shown in FIG. 11, input data from an input device is input to an input module 50, output therefrom is input to a data conversion module 51, output therefrom is input to an output module 52, and data is output from the output module 52 to an output device.

Each module is a plug-in module that can be built in later as desired. The input module 50 reads input data from the specified input device and the data conversion module 51 converts input data from the input module 51 into a predetermined data conversion format. The output module 52 outputs the data provided by the data conversion module 51 to the specific output device. Usually, the modules are connected as pipelining and perform data processing concurrently, so that streaming processing of the input data is made possible.

In the described configuration, if an input data file is not a multiplex file, namely, is a file that can undergo only one data conversion (decode) to provide the objective output data, for example, if the data is input data compressed only in a specific format, the data conversion module 51 is one data conversion module for decompressing the input data. If the input data is double encoded as a multiplex file, for example, if the data is compressed and further encrypted, the data conversion module 51 consists of a data conversion module for decrypting the encrypted data and a data conversion module for decompressing the compressed data. The data conversion module 51 is thus built in as a plug-in module as desired in response to the type of data input from an input device, namely, corresponding to the encode level (the number of encode stages) and the encode modes, so that data conversion (decode) can be accomplished for any input data.

(B) FIG. 12 is a block diagram of a system disclosed in JP-A-2000-236386. The destination data format contained in source data before conversion is read by a system conversion controller 60 and streaming conversion modules 61 to 63 required for converting the data into the format are selected and are optimally arranged. The streaming data of the source data is converted (decoded) under the pipeline control of the arranged conversion modules.

The system in (A) involves a problem of lacking flexibility of data processing because the number of pipeline processing stages for performing data processing (plug-in modules) is fixed to the once setup number. That is, once the data conversion module 51 in FIG. 11 is determined, the input data format and the output data format are determined and thus when input data in any other format is input, the data cannot correctly be converted (decoded). The systems in (A) and (B) involve a problem of incapability of handling input data whose output data format is found only at the execution time. The input data whose output data format is found only at the execution time refers to input data in a multiplex file undergoing multiple encoding in different conversion formats not defined before the execution time. The data conversion format at least at the first encode time cannot be known until such input data is actually converted. Therefore, before execution of data conversion, for example, what conversion module 51 in FIG. 11 may be placed cannot be known and, what streaming conversion modules in FIG. 12 may be selected cannot be determined.

SUMMARY OF THE INVENTION

It is an object of the invention to provide an input data conversion method, an input data conversion program, and an input data conversion system for dynamically dealing with input data whose output data format is found only at the execution time of data conversion.

According to the invention, there is provided an input data conversion method for executing the following steps (1) to (3) for input data in a multiplex file provided by multiple-encoding data in a plurality of conversion systems:

(1) Making reference only to headers of files in the multiplex file in the inverse order of encoding, determining the output data format of each file, and selecting data conversion modules required for conversion to the output data formats.

(2) Combining the data conversion modules selected in (1) in the selection order.

(3) Executing conversion processing of the input data by the data conversion modules combined in (2).

In the invention, when the processing in (1) is performed, data body conversion (decode) processing is not performed. Reference is made only to headers of partial data in the multiplex file, the output data format of each file is determined, and data conversion modules required for conversion to the output data formats are selected. Thus, all data conversion modules required for data conversion (decode) can be selected by the time data conversion is executed. The selected data conversion modules are combined in the selection order. The data conversion modules thus combined execute input data conversion processing. Therefore, for example, to perform data conversion processing of input data in a double file comprising an encrypted file with extension ".mrm" ("mrm" is a specific encryption extension) of a compressed file with extension ".zip," in the invention, first it is determined that the output data format is ".mrm" and the data conversion module corresponding to the data conversion format is selected. Next, it is determined that the output data format is ".zip" and the data conversion module corresponding to the data conversion format is selected. Then, the data conversion modules are combined in the selection order. Likewise, for example, if the file with the extension ".mrm" is further encrypted to form a triple file, the data conversion module corresponding to the encryption data conversion format is placed at the first position.

Thus, in the invention, for the input data in a multiplex file provided by multiple-encoding data in a plurality of conversion systems, the output data formats of the headers of the files are read one after another and the data conversion modules required by the time the input data is converted into the final output data can be automatically selected and combined. Accordingly, the data conversion modules can be combined dynamically in response to the input data.

In the invention, all data conversion modules that can be selected are previously defined and the required data conversion modules are selected from among the predefined data conversion modules. In doing so, a large number of data conversion modules are provided as plug-in files and the data conversion modules required for data conversion are selected automatically from among the plug-in files (data conversion modules).

In the invention, an input module is joined to the input side of the data conversion modules thus combined and an output module is joined to the output side. The input module inputs input data from an input device. It makes reference to the URL (Uniform Resource Locator) of the input data or the response header in the protocol at the communicating time (for example, the content type header in the response header in the HTTP protocol) and determines the output data format of the file. The output module is joined to the data conversion module at the last stage of the joined modules and outputs the data after undergoing the final conversion. Further, the output module notifies the module manager for managing the modules that the output module is the termination.

According to the invention, the input module is joined, whereby the input device for inputting input data can be selected from among any desired devices. For example, a local file (file existing in a file system in a computer) can also be specified as a source and a file that can be downloaded from the Internet according to the URL can also be specified as a source. The output module is joined, whereby it is made possible to output data fitted to the output device.

BRIEF DESCRIPTION OF THE DRAWINGS

FIG. 5 is a drawing to show a pipeline constructing procedure;

FIG. 6 is a drawing to show a format example of input data;

FIG. 7 is a drawing to show a notification data format;

DETAILED DESCRIPTION OF PREFERRED EMBODIMENTS

Figure 1:
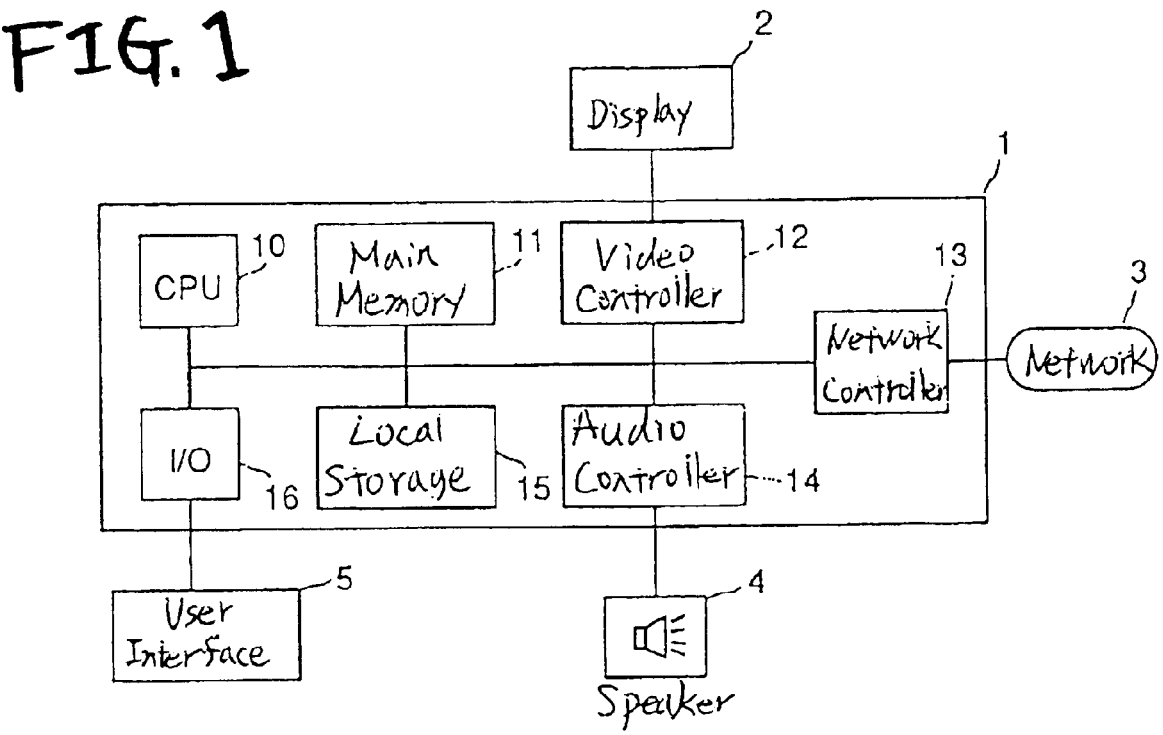
FIG. 1 is a block diagram of a data processing apparatus in an embodiment of the invention.

FIG. 1 is a block diagram of a data processing apparatus for executing a dynamic conversion method of input data according to the invention. The data processing apparatus is implemented, for example, as a personal computer or a mobile data processing apparatus of a mobile telephone, etc., and input data to be converted can contain various media data of a moving image, a still image, sound, text, etc. A data processing apparatus main unit 1 comprises a CPU 10 for performing data processing, main memory 11, a video controller 12, a network controller 13, an audio controller 14, local storage 15, and an I/O device 16. A dynamic conversion program of input data according to the invention is installed in the main memory 11. A display monitor 2 can be connected to the video controller 12 for displaying the image data as the input data processing result and providing an interface with the user. A network 3 such as the Internet is connected to the network controller 13. A speaker 4 can be connected to the audio controller 14 for outputting sound data as the input data processing result. A user interface 5 including a keyboard, a mouse, etc., is connected to the I/O device 16.

The dynamic conversion program of input data stored in the main memory 11 can be saved in the local storage 15 such as an HDD and can be acquired from any desired resource through the network 3. The dynamic conversion program of input data can also be acquired through any desired storage medium such as a CD-ROM or a floppy (R) disk. The data processing apparatus uses an input data file that can be acquired through the network 3 or a local file stored in the local storage 15 as a source and performs dynamic data conversion processing of the file by the dynamic conversion program. The data processing apparatus outputs the processing result to the display 2 as an image, text, etc., and also outputs the processing result to the speaker 4 as sound. As described later, data conversion modules can be selected and combined for a moment by the dynamic conversion program and then streaming processing of data conversion processing is performed.

Figure 2:
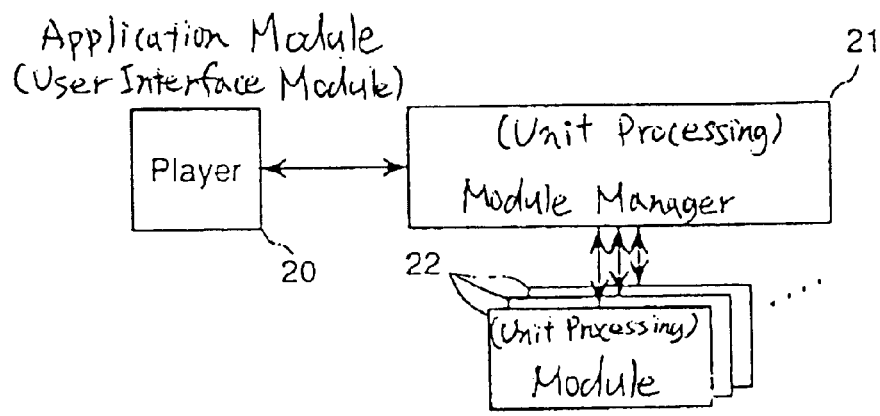
FIG. 2 is a drawing to show modules of a dynamic conversion program of input data in the embodiment of the invention.

FIG. 2 shows modules (unit programs) making up the dynamic conversion program of input data.

The module group are constituted by an application module 20, a unit processing module manager (simply, module manager) 21, and one or more unit processing modules ((simply, modules) 22. The application module 20 includes a user interface module for interfacing with the user and notifies the module manager 21 that data conversion processing of a specific input data file is to be performed. The application module is represented as an execution module with an extension of such as ".exe" in an operating system of Windows (R) 98, for example.

Figure 3:
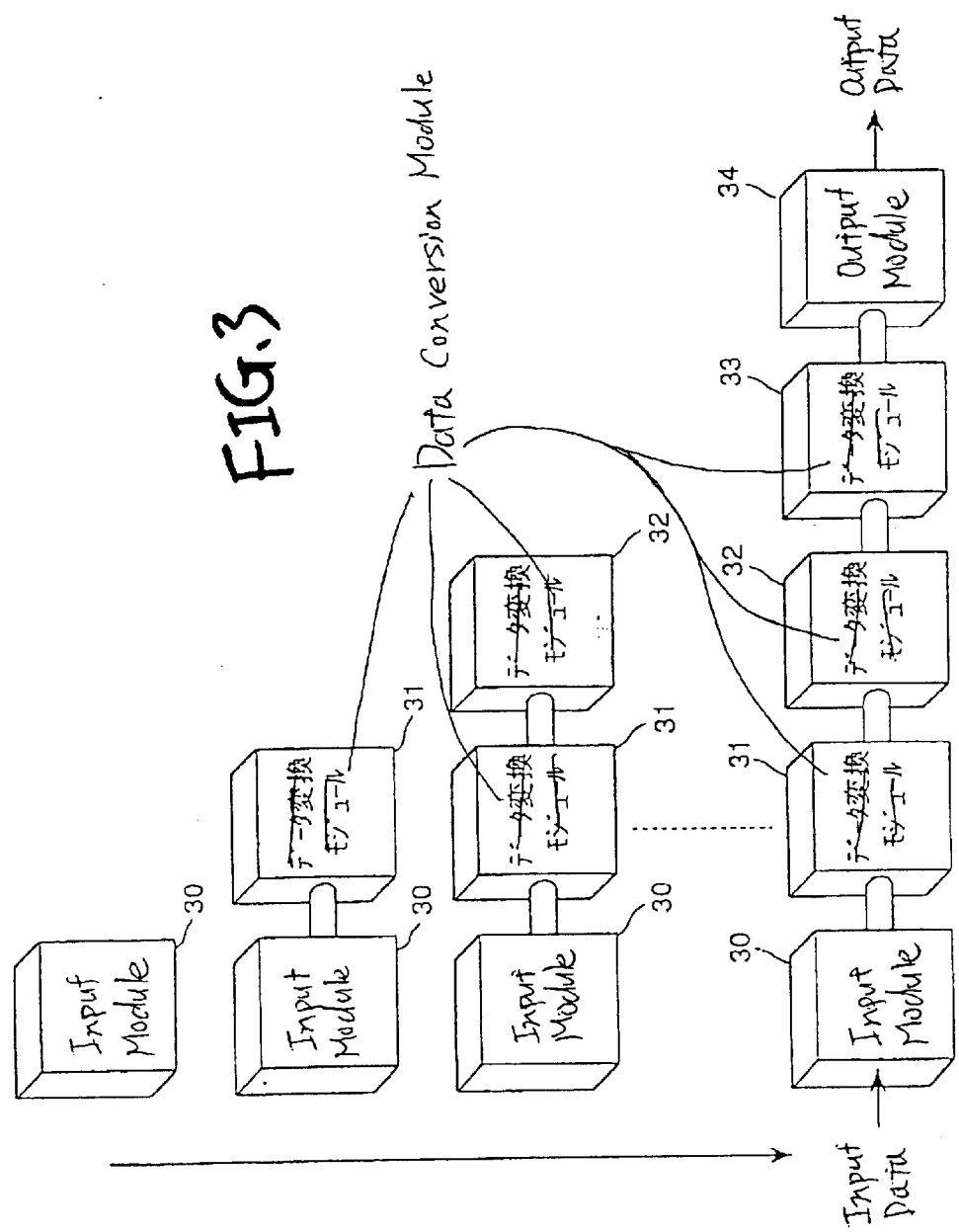
FIG. 3 is a drawing to show how a pipeline is constructed.

The module manager 21 manages the modules 22. Specifically, the module manager 21 collects information concerning the modules 22 provided as plug-in modules, namely, the data conversion formats (data formats of input data and output data) that can be processed by the modules, and the module manager 21 defines the modules in a list, and combines the modules 22 required for converting (decoding) data in the input data file specified by the application module 20. In the embodiment, the combined modules 22 are joined in order as a pipeline, as shown in FIG. 3, and pipeline processing of input data files is made possible. In the example shown in FIG. 3, first an input module 30 in the modules 22 is selected, next a first data conversion module 31 is joined to the end of the input module 30, next a second data conversion module 32 is joined to the end of the first data conversion module 31, next a third data conversion module 33 is joined to the end of the second data conversion module 32, and last an output module 34 is joined. In the case the pipeline thus constructed, the input data is input to the input module 30 for performing data conversion (decode) processing of the input data. At this time, the pipeline makes it possible to perform streaming conversion processing in real time.

To adopt Windows (R) 98, etc., as the operating system, the module manager 21 is represented as a module with an extension of ".dll" and the modules 22 are stored as modules with an extension of ".dll" in a plug-in folder.

Figure 4:
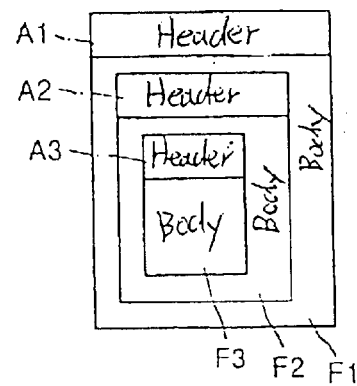
FIG. 4 is a conceptual drawing of a multiplex file created by encoding data in different conversion systems.

FIG. 4 shows a configuration example of input data. As shown in the figure, the input data file is a triple multiplex file. A file F3 is original data, a file F2 is an encode file of F3, and a file F1 is an encode file of F2. A header of each file (A1, A2, A3) stores the output data format when the corresponding file is decoded. For example, the header A1 of the file F1 stores the output data format of the file F2 and the header A2 of the file F2 stores the output data format of the file F3. To convert (decode) the input data shown in FIG. 4, the input module 30, the output module 34, and the three data conversion modules 31 to 33 combined between the input and output modules are required. The first data conversion module 31 performs data conversion processing based on the output data format reported by the input module, the second data conversion module 32 performs data conversion processing based on the output data format stored in the header A1, and the third data conversion module 33 performs data conversion processing based on the output data format stored in the header A2. Information stored in the header A3 is proper to the file F3 and substantial conversion processing of the data body is not performed. Before actual data conversion processing is performed, the output data formats stored in the headers A1 to A3 are read and a pipeline as shown in FIG. 3 is constructed. When the pipeline is constructed, the input data is read into the input module 30 and stream processing is performed.

As described above, to select and combine the modules 22, a plurality of data conversion modules required for converting (decoding) the input data are selected and combined between the input module 30 and the output module 34, as illustrated in FIG. 5.

To begin with, the input module 30 is selected for specifying which of the network 3 and the local storage 15 the input data as a source is to be acquired from so as to input the input data appropriately. Next, the input module 30 refers to a content type header in a response header in URL or HTTP protocol of the input data and determines the output data format, and then notifies the module manager 21 of the output data format. When the module manager 21 determines the output data format of the outermost file, it selects the first data conversion module 31 required for converting the data from among the data conversion modules stored in the plug-in folder and joins the selected data conversion module to the input module 30. Next, the data conversion module 31 determines the output data format stored in the header A1 of the input data file and notifies the module manager 21 of the output data format. The module manager 21 determines the output data format, selects the data conversion module 32 required for converting the data from among the data conversion modules stored in the plug-in folder, and joins the selected data conversion module to the end of the data conversion module 31. Further, likewise the module manager 21 joins the data conversion module 33 to the end of the data conversion module 32 and last joins the output module 34 for outputting data to the output device to the data conversion module 33. For the pipeline thus constructed, the module manager 21 starts inputting the input data and executes data conversion (decode).

Next, specific examples will be discussed with reference to FIGS. 6 to 8.

FIG. 6 shows a format example of input data. In this example, input data is a triple file. The original data is encoded in the order of compressing with extension ".zip" and encrypting with extension ".mrm". The original data is MIDI data. Therefore, the multiplex file is provided by multiplexing MIDI file F3, compressed file F2, and encrypted file F1.

As the output data format, extension ".zip" is specified in the header A1 of the encrypted file F1. As the output data format, extension ".mid" is specified in the header A2 of the compressed file F2. Information concerning the MIDI format is specified in the header A3 of the MIDI file F3. The MIDI file F3, which stores MIDI data, need not essentially be converted into any other format; in the embodiment, however, the MIDI file is converted into an internal unique format easier to handle before the file is passed to the output module at the last stage and thus the module manager is notified of the output data format of the internal unique format.

FIG. 7 shows a notification data format used when each module notifies the module manager of the output data format or the module manager specifies the operation for each module. As shown in FIG. 7, the notification data format comprises areas 1 to 5 for storing "tag," "URL," "MIME," "EXT," and "additional information" respectively. The "tag" specifies the type of operation from the module manager to each module. "URL" specifies URL from the module manager to the input module. "MIME" specifies MIME (Multipurpose Internet Mail Extensions) type. "EXT" specifies extension. The "additional information" specifies additional information added as required. The output data format for the module manager is notified by using "MIME" and "EXT". The output data format can be specified using the extension "EXT" or the MIME type "MIME". Normally, when the extension is specified, the MIME type is not required; however, there is a possibility that the extension may be changed by erroneous operation or intentionally, and thus the MIME type is more reliable. The module manager sends "tag" or "URL" to each module and sends URL to the input module. "URL" is, for example, "file://c:/test.mrm" or "http:// . . . ". The former specifies the file storage location in the local storage 15 (see FIG. 1) and the latter indicates the file storage location connected to the network 3. Generally, "file," "http," or "ftp" is called protocol and "path" and "file name" are joined to the protocol, whereby the file to be acquired can be specified.

Figure 8:
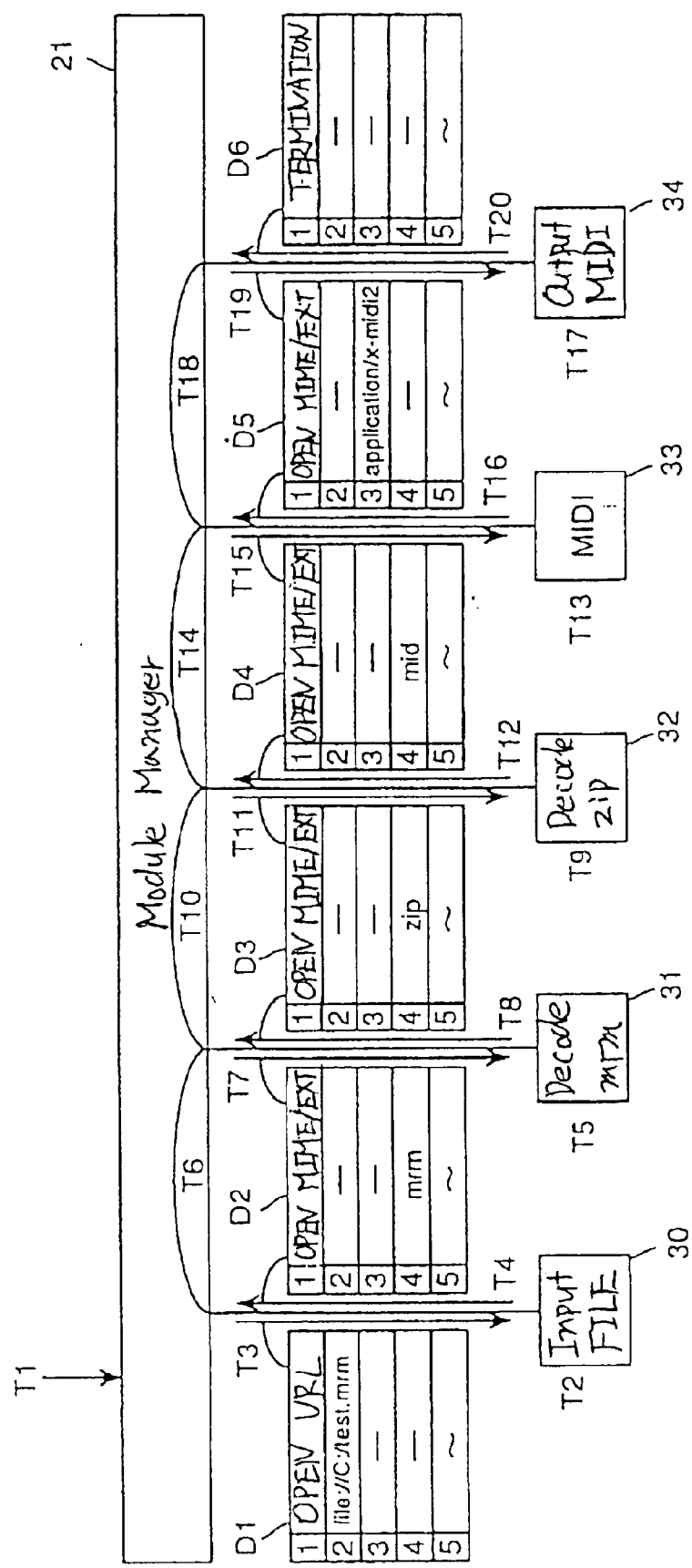
FIG. 8 is a drawing to specifically describe pipeline construction operation.

FIG. 8 is a drawing to describe steps for constructing a pipeline for the input data shown in FIG. 6.

T1: The module manager 21 receives a file (input data) open request from the application module 20 (see FIG. 2).

T2: The input module 30 matching the protocol is generated. Here, the protocol is assumed to be "file." Therefore, the input data (file) is loaded from the local storage 15 (see FIG. 1).

T3: The module manager 21 specifies a file "test.mrm" by notification data D1 and opens the input module 30.

T4: The input module 30 makes reference to the extension of the specified file and determines the output data format.

Since the specified file may be a server side script for transmitting a content file according to the HTTP protocol rather than the content file itself, if the output data cannot be specified based on the extension, the input module 30 makes reference to the content type header in the response header in the HTTP protocol and determines the output data format. In this case, the data is determined to be encrypted data whose output data format is represented by extension ".mrm" based on the extension ".mrm" of "test.mrm" and thus the input module 30 notifies the module manager 21 of the output data format in area 4 of notification data D2.

T5: The module manager 21 generates the data conversion module 31 for decoding (converting) the encrypted data with the extension ".mrm".

T6: The module manager 21 joins the generated data conversion module 31 to the end of the pipeline (here, the end of the input module 30).

T7: The module manager 21 opens the data conversion module 31. This operation is specified in area 1 of the notification data D2.

T8: As the data conversion module 31 is opened, a part of the data is input to the data conversion module 31 via the pipeline. At this time, the data conversion module 31 makes reference to the header A1 of the encrypted file F1, determines the output data format of the compressed file F2 to be next decoded (converted), and notifies the module manager 21 of the output data format in area 4 of notification data D3.

T9: The module manager 21 generates the data conversion module 32 corresponding to the output data format reported at T8. Since the output data format at this time is represented by extension ".zip," the data conversion module 32 decodes (converts) compressed data with the extension ".zip".

T10: The module manager 21 joins the data conversion module 32 to the end of the pipeline (here, the end of the data conversion module 31 preceding the data conversion module 32).

T11: The module manager 21 opens the data conversion module 32. This open operation is specified in area 1 of the notification data D3.

T12: As the data conversion module 32 is opened, a part of the data is input to the data conversion module 32 via the pipeline. At this time, the data conversion module 32 makes reference to the header A2 of the compressed file F2 of the input data multiplexed. The header A2 stores the output data format at the decoding (converting) time of the data conversion module 32. In the example, the output data format represents MIDI data represented by extension ".mid". The data conversion module 32 notifies the module manager 21 of the output data format in area 4 of notification data D4.

T13: Upon reception of the notification at T12, the module manager 21 generates the data conversion module 33 for decoding (converting) the MIDI data represented by the extension ".mid".

T14: The module manager 21 joins the data conversion module 33 generated at T13 to the end of the pipeline (in the example, the end of the data conversion module 32).

T15: The module manager 21 opens the data conversion module 33.

T16: As the data conversion module 33 is opened, a part of the input data passes through the pipeline and is input to the data conversion module 33. At this time, the data conversion module 33 converts the received MIDI file into the internal unique format easier to handle. Here, the output data format is represented by "application/x-midi2." The data conversion module 33 notifies the module manager 21 of the output data format thus determined. The output data format of "application/x-midi2" is specified by the MIDI type rather than an extension. Therefore, using area 3 of notification data D5, the module manager 21 is notified of the output data format.

T17: Upon reception of the notification at T16, the module manager 21 generates the output module 34.

T18: The module manager 21 joins the output module 34 to the end of the pipeline (here, the end of the data conversion module 33).

T19: The module manager 21 opens the output module 34. This open operation is specified in area 1 of the notification data D5.

T20: As the output module 34 is opened, a part of the input data passes through the pipeline and the output module 34 determines that it is at the termination position of the pipeline. Then, the output module 34 notifies the module manager 21 that it is at the termination in area 1 of notification data D6.

At T1 to T20, each module reads only the data of the headers of the input data multiplexed. Thus, the processing time required for constructing the pipeline is a moment. In the example, pipeline construction for the triply multiplexed input data is shown as in FIG. 6. However, if the input data is quadruply multiplexed, one additional data conversion module is placed between the input module 30 and the output module 34. Thus, in the embodiment, reference is made only to the headers of the files in the inverse order of encoding the multiplexed input data, the output data formats of the files are determined, and the data conversion modules required for converting (decoding) into the formats are selected and combined to form a pipeline, so that even if the input data multiplexing level or the encode system is not known, the pipeline to correctly decode (convert) can be constructed dynamically. After the pipeline is constructed, the input data is input to the input module 30 and is subjected to streaming processing along the pipeline.

Figure 9:
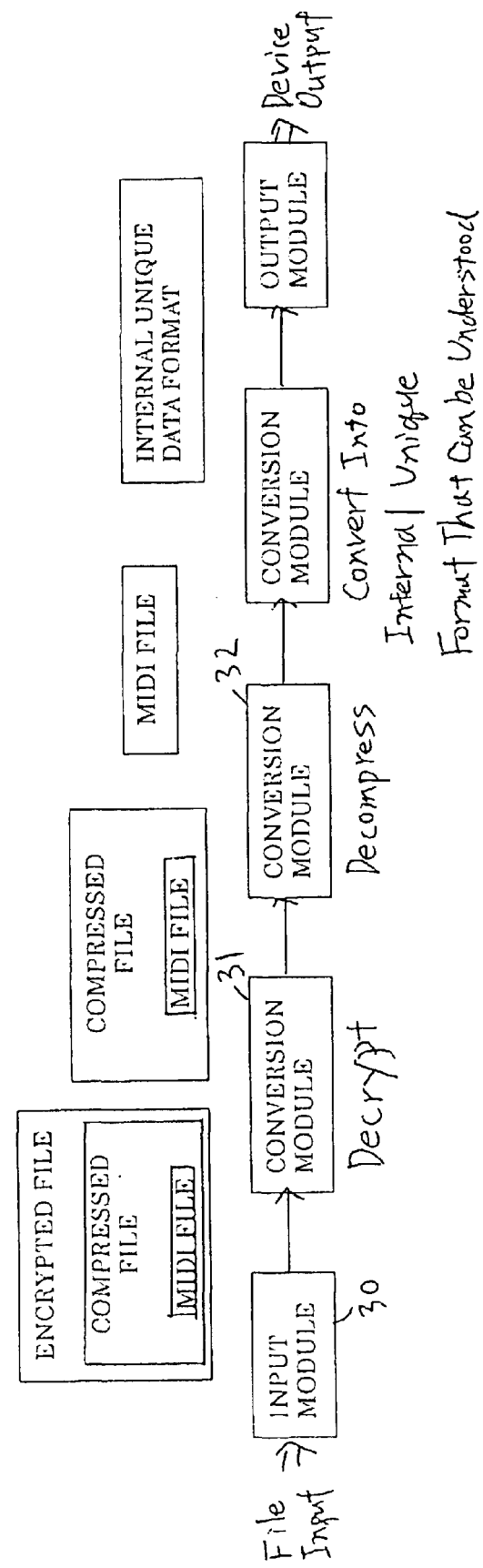
FIG. 9 is a drawing to show a state in which input data decode (conversion) processing is performed along the constructed pipeline.

FIG. 9 shows the state in which input data decode (conversion) processing is performed along the pipeline. The input data input to the input module 30 is decoded by the data conversion module 31, is decompressed by the data conversion module 32 following the data conversion module 31, is converted into specific MIDI data by the data conversion module 33 following the data conversion module 32, and is output to the output device by the output module 34 at the last stage.

In FIG. 2, the modules 22 are stored in a specific plug-in folder as plug-in modules. Before constructing a pipeline, the module manager 21 collects information concerning the modules in the plug-in folder, creates a list, and defines the modules. To define each module, the processing function (capability) of the module is determined and is stored in the list. The module manager 21 selects appropriate modules from among the data conversion modules thus predefined and generates the modules to construct a pipeline. The term "generate" mentioned here is used to mean that the class entity (instance) is generated in an object-oriented language. For example, generating the input module 30 refers to generating the entity of the input module 30 in memory.

Figure 10:
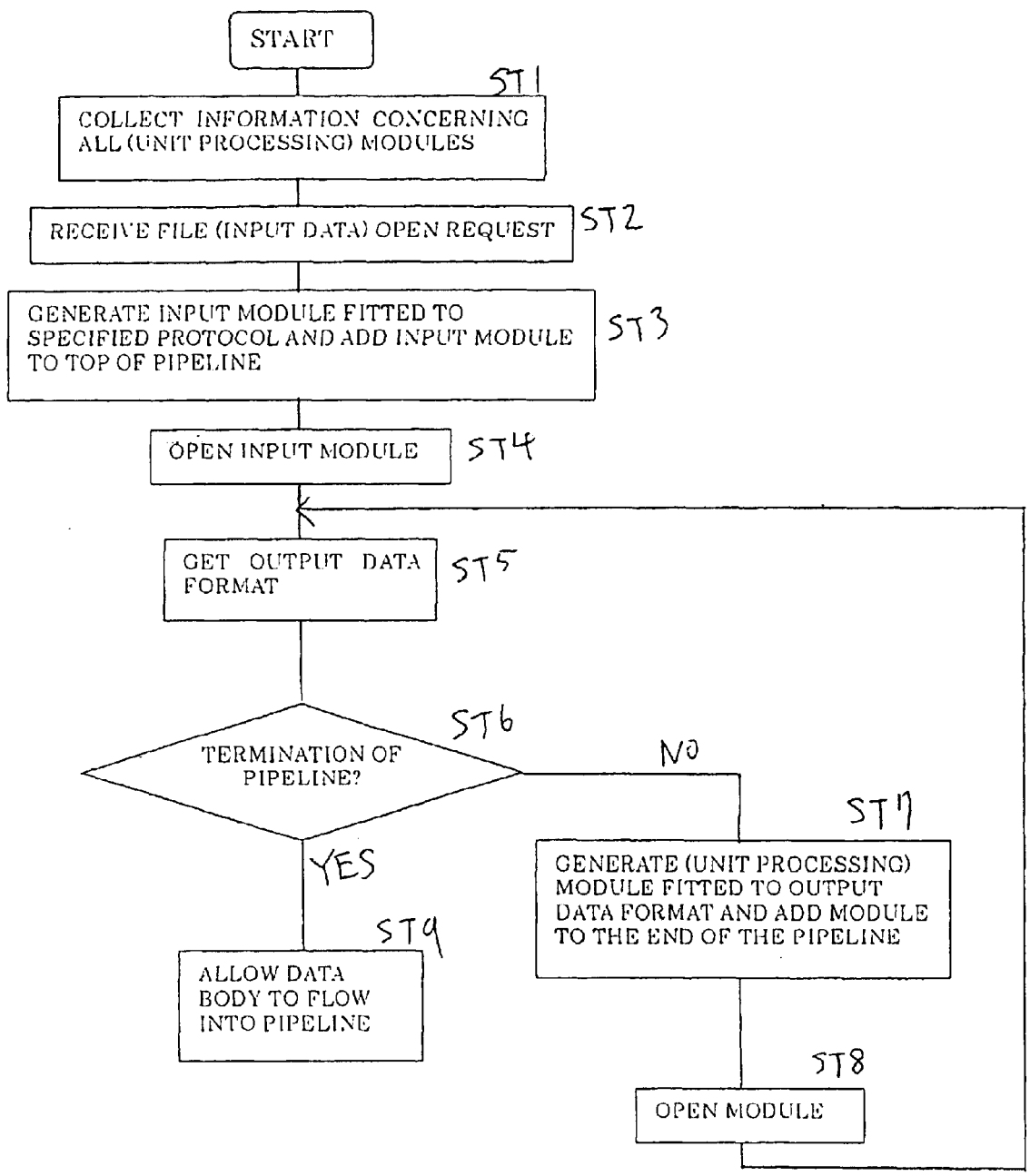
FIG. 10 is a flowchart to show a pipeline constructing procedure.
Figure 11:
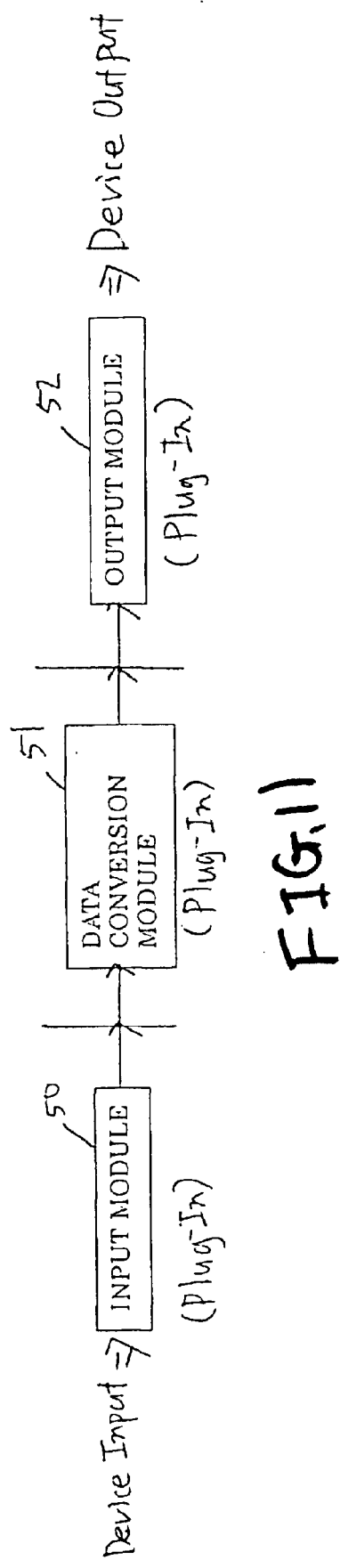
FIG. 11 is a schematic block diagram of an input data conversion system in a related art.
Figure 12:
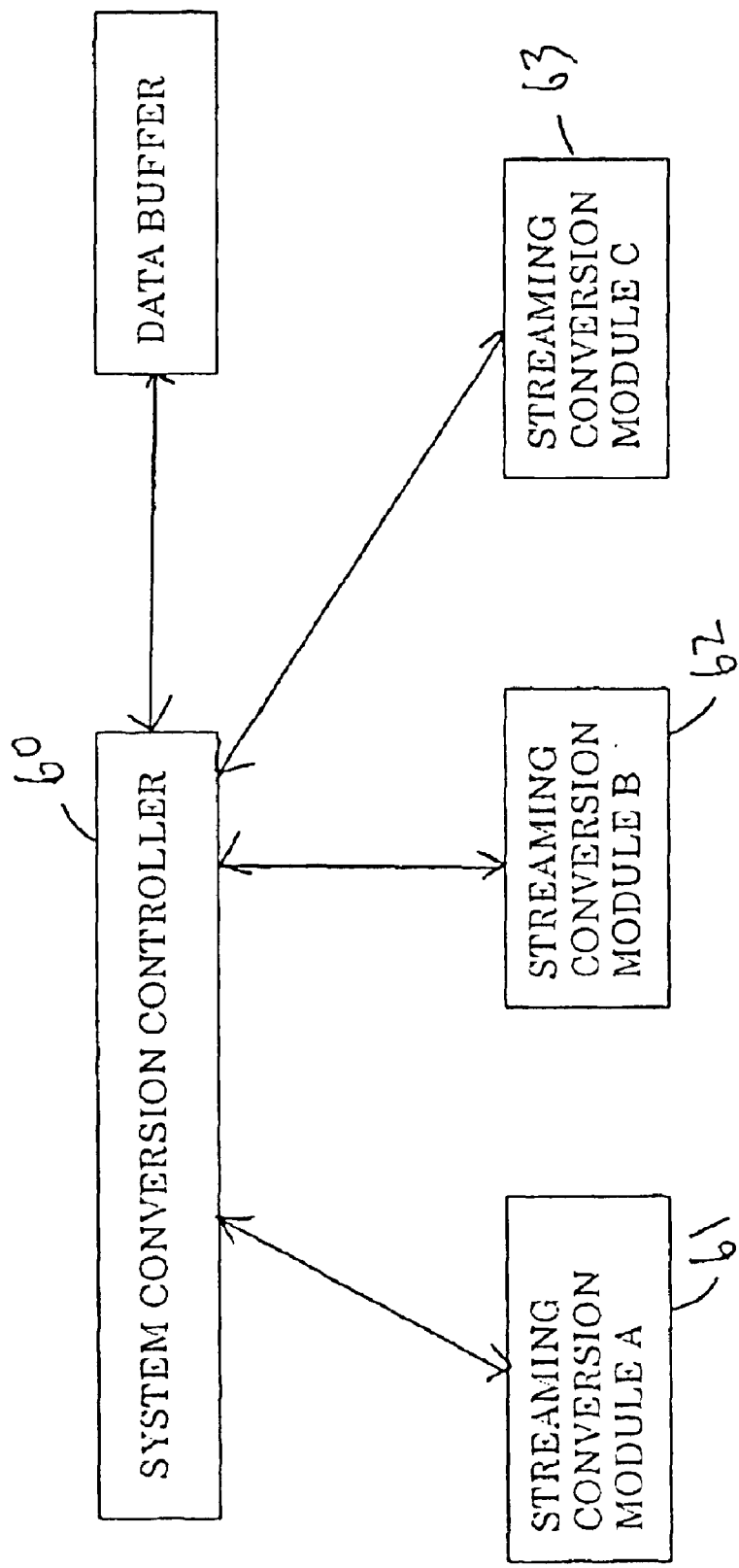
FIG. 12 is a schematic block diagram of an input data conversion system in another related art.

FIG. 10 is a flowchart to show a procedure for constructing a pipeline according to the embodiment.

At step ST1, the module manager 21 collects information concerning all modules placed in the plug-in folder. At ST2, the module manager 21 receives a file (input data) open request from the application module 20. The module manager 21 generates the input module 30 fitted to the specified protocol and adds the input module 30 to the top of the pipeline (ST3). Further, the module manager 21 opens the input module 30 at ST4.

The opened input module 30 determines the output data format of the outermost file from the content type header in the response header in the URL or HTTP protocol and notifies the module manager 21 of the output data format. Upon reception of the notification, the module manager 21 gets the output data format (ST5), determines that the pipeline does not reach the termination (ST6), and generates a module fitted to the output data format (data conversion module or output module) and adds the generated module to the end of the pipeline (ST7). The module manager 21 opens the module (ST8) and returns to ST5. When the module manager 21 knows that the pipeline reaches the termination, it stops the subsequent pipeline construction operation and subsequently data body decode (conversion) processing is performed.

In the described processing, the pipeline construction operation at ST1 to ST8 is performed only with the header data. Therefore, if not all input data is received, a necessary and sufficient pipeline for correcting converting (decoding) the input data can be constructed. Data body conversion processing along the pipeline can be performed by streaming.

The embodiment is effective for input data in a multiplex file multiple-encoded and can also deal with input data encoded only once. In this case, one data conversion module is placed between the input and output modules. Input data streaming processing is made possible by connecting the modules as a pipeline; however, the modules may be simply cascaded and decode (conversion) processing may be performed in order one file at a time at each stage.

In the invention, a plurality of data conversion modules are sandwiched between the input and output modules to construct a pipeline, but the input and output modules are not necessarily required and it is also possible to assign the functions of the input and output modules to the data conversion modules.

According to the invention, input data whose final output data format is found only at the execution time of data conversion (decode), namely, a multiplex file provided by performing multiple encode processing of data can be handled. The number of data conversion modules is not fixed and the data conversion modules are generated dynamically, so that various data formats can be handled.

What is claimed is:

1. An input data conversion method of executing data conversion for input data as a multiplex file provided by multiple-encoding data in a plurality of conversion systems, the method comprising the steps of:

making reference only to headers of files in the multiplex file in the inverse order of encoding, determining an output data format of each file, and selecting data conversion modules required for conversion to the respective output data formats;

combining the data conversion modules selected in the making step in the selection order; and executing conversion processing of the input data by the data conversion modules combined in the combining step.

2. The input data conversion method according to claim 1, wherein all data conversion modules that can be selected are defined before the making step and the data conversion modules required for conversion to the respective output data formats are selected from among the defined data conversion modules.

3. The input data conversion method according to claim 1, wherein in the combining step, an input module for inputting the input data from an input device is joined to the top of the data conversion modules, an output module for outputting output data to an output device is joined to the last stage of the combined data conversion modules, and in the executing step, the data after undergoing the data conversion is output from the output module, and the input data is input to the top of the combined data conversion modules for executing data conversion.

4. An input data conversion program for causing a CPU to execute steps for input data as a multiplex file provided by multiple-encoding data in a plurality of conversion systems, the steps comprising:

making reference only to headers of files in the multiplex file in the inverse order of encoding, determining an output data format of each file, and selecting data conversion modules required for conversion to the respective output data formats;

combining the data conversion modules selected in the making step in the selection order; and executing conversion processing of the input data by the data conversion modules combined in the combing step.

5. The input data conversion program according to claim 4, wherein the CPU is caused to execute the step of defining all data conversion modules that can be selected and selecting the data conversion modules required for conversion to the output data formats from among the defined data conversion modules before the CPU is caused to execute the making step.

6. The input data conversion program according to claim 4, wherein the CPU is caused to execute the step of joining an input module for inputting the input data from an input device to the top of the data conversion modules, joining an output module for outputting output data to an output device to the last stage of the combined data conversion modules, inputting the input data to the top of the combined data conversion modules for executing data conversion, and outputting the data after undergoing the data conversion from the output module.

7. An input data conversion system comprising:

an input module for performing processing of inputting, from an input device, input data as a multiplex file provided by multiple-encoding data in a plurality of conversion systems;

at least one data conversion module for performing conversion processing of the input data;

an output module for outputting, to an output device, data provided by performing conversion processing of the input data by the at least one data conversion module; and a module manager for combining the input module, the at least one data conversion module, and the output module in this order and inputting the input data to the input module at the top of the combined modules for performing data conversion processing, wherein when the at least one data conversion module is combined, each module makes reference only to a header of a file processed in the module, determines a output data format of the file, and notifies the module manager of the output data format, and wherein at the module combining time, the module manager selects the data conversion module corresponding to the output data format reported from each module and joins the selected data conversion module to the preceding module.

* * * * *